(12) United States Patent
Park et al.

(10) Patent No.: US 9,168,826 B2
(45) Date of Patent: *Oct. 27, 2015

(54) HYBRID POWER TRAIN FOR VEHICLE

(71) Applicant: Hyundai Motor Company, Seoul (KR)

(72) Inventors: Jong Yun Park, Hwaseong-si (KR); Kyung Ha Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,030

(22) Filed: May 6, 2014

(65) Prior Publication Data

US 2015/0148166 A1 May 28, 2015

(30) Foreign Application Priority Data

Nov. 25, 2013 (KR) .................. 10-2013-0143609

(51) Int. Cl.
*F16H 3/093* (2006.01)
*B60K 6/547* (2007.10)
*B60W 10/02* (2006.01)
*B60W 20/00* (2006.01)

(52) U.S. Cl.
CPC ............. *B60K 6/547* (2013.01); *B60W 10/02* (2013.01); *B60W 20/40* (2013.01); *F16H 2003/0938* (2013.01); *Y10S 903/902* (2013.01)

(58) Field of Classification Search
CPC .............................................. F16H 2003/0938
USPC .......................................................... 475/312
See application file for complete search history.

(56) References Cited

U.S. PATENT DOCUMENTS

| | | | |
|---|---|---|---|
| 4,566,348 A * | 1/1986 | Akashi et al. | 74/359 |
| 5,224,907 A * | 7/1993 | Shirataki | 475/205 |
| 2009/0170649 A1* | 7/2009 | Murakami et al. | 475/5 |

FOREIGN PATENT DOCUMENTS

| | | |
|---|---|---|
| JP | 11-227476 A | 8/1999 |
| JP | 2010-120567 A | 6/2010 |
| KR | 10-2011-0049401 A | 5/2011 |
| KR | 10-2012-0019855 A | 3/2012 |

* cited by examiner

*Primary Examiner* — Ramya Burgess
*Assistant Examiner* — David Morris
(74) *Attorney, Agent, or Firm* — Morgan, Lewis & Bockius LLP

(57) ABSTRACT

A hybrid power train for a vehicle may include an input shaft, an engine side driving gear mounted at the input shaft, an output shaft, an engine side driven gear fixedly mounted at the output shaft and meshed with the engine side driving gear, a motor side driving gear and mounted to rotate by the motor, a motor side driven gear fixedly mounted at the output shaft and meshed with the motor side driving gear, an output gear rotatably mounted at the output shaft, a one way clutch mounted between the output gear and the output shaft, a clutch device mounted on the output shaft, and a planetary gear apparatus engaging between the output shaft and the output gear.

7 Claims, 5 Drawing Sheets

HYBRID POWER TRAIN FOR VEHICLE

CROSS REFERENCE TO RELATED APPLICATION

The present application claims priority of Korean Patent Application Number 10-2013-0143609 filed on Nov. 25, 2013, the entire contents of which is incorporated herein for all purposes by this reference.

BACKGROUND OF THE INVENTION

1. Field of the Invention

The present invention relates to a hybrid power train for a vehicle, and more particularly, to a technology of a power train for a vehicle capable of providing a driving force of a vehicle as power output from an engine which is an internal combustion engine and a motor driven with electricity.

2. Description of Related Art

A hybrid power train to drive a vehicle by properly and harmoniously operating power generated from an engine which is an internal combustion engine and power generated from a motor driven with electricity basically uses a complementary aspect of a torque characteristic of the engine and a torque characteristic of the motor to improve driving efficiency of a vehicle.

Therefore, the hybrid power train according to the related art implements an EV mode which uses the characteristic of the motor with an excellent low speed torque characteristic by allowing the motor to drive the vehicle mainly at the time of a starting of the vehicle or in a low speed condition, implements an engine mode which allows the engine with a relatively excellent torque characteristic to drive the vehicle in a middle speed or high speed condition, and implements a hybrid mode which may use the torques of the engine and the motor in a driving condition demanding a high torque.

The hybrid power train used in the vehicle may implement a plurality of shift stages for each mode by a simple configuration if possible, while implementing various driving modes by maximally using the torque characteristics of the engine and the motor as described above.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid power train for a vehicle capable of improving efficiency of a vehicle and improving fuel efficiency of the vehicle, by implementing various driving modes by maximally using torque characteristics of an engine and a motor and implementing a plurality of shift stages for each mode by a simple configuration, if possible.

In an aspect of the present invention, a hybrid power train for a vehicle, may include an input shaft selectively receiving power from an engine, an engine side driving gear mounted at the input shaft, an output shaft disposed in parallel with the input shaft, an engine side driven gear fixedly mounted at the output shaft and meshed with the engine side driving gear, a motor side driving gear mounted to form a concentric shaft with the input shaft and mounted to rotate by the motor, a motor side driven gear fixedly mounted at the output shaft and meshed with the motor side driving gear, an output gear rotatably mounted at the output shaft, a one way clutch mounted between the output gear and the output shaft so as to transmit power from the output shaft only to the output gear at a time of a forward driving of the vehicle, a clutch device mounted on the output shaft and transmitting a power from the output shaft to the output gear at a time of a reverse driving of the vehicle, and a planetary gear apparatus engaging between the output shaft and the output gear.

In the planetary gear apparatus, a carrier is directly connected to the output shaft, a ring gear is directly connected to the output gear, and a sun gear is fixedly mounted at the output shaft while forming a concentric shaft, wherein the planetary gear apparatus is provided with a brake to selectively fix a rotation of the sun gear.

The clutch device is formed of a dog clutch which is configured to convert a state of fixing and unlocking the output gear to and from the output shaft.

The clutch device is formed of a synchro mesh type synchro mechanism which converts a state of fixing and unlocking the output gear to and from the output shaft.

The engine side driving gear may have a diameter larger than that of the engine side driven gear, wherein the motor side driving gear may have a diameter smaller than that of the motor side driven gear.

An engine clutch is mounted between the input shaft and an engine rotating shaft of the engine to selectively block the power to the input shaft.

The hybrid power train may further include a driving gear mounted at the engine rotating shaft, a driven gear rotatably mounted at the engine rotating shaft while forming a concentric shaft and connected a generator to rotate the generator, an idler shaft disposed in parallel with the engine rotating shaft, wherein the idler shaft is connected to a first medium gear which is meshed with the driving gear and to a second medium gear which is meshed with the driven gear for power generation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
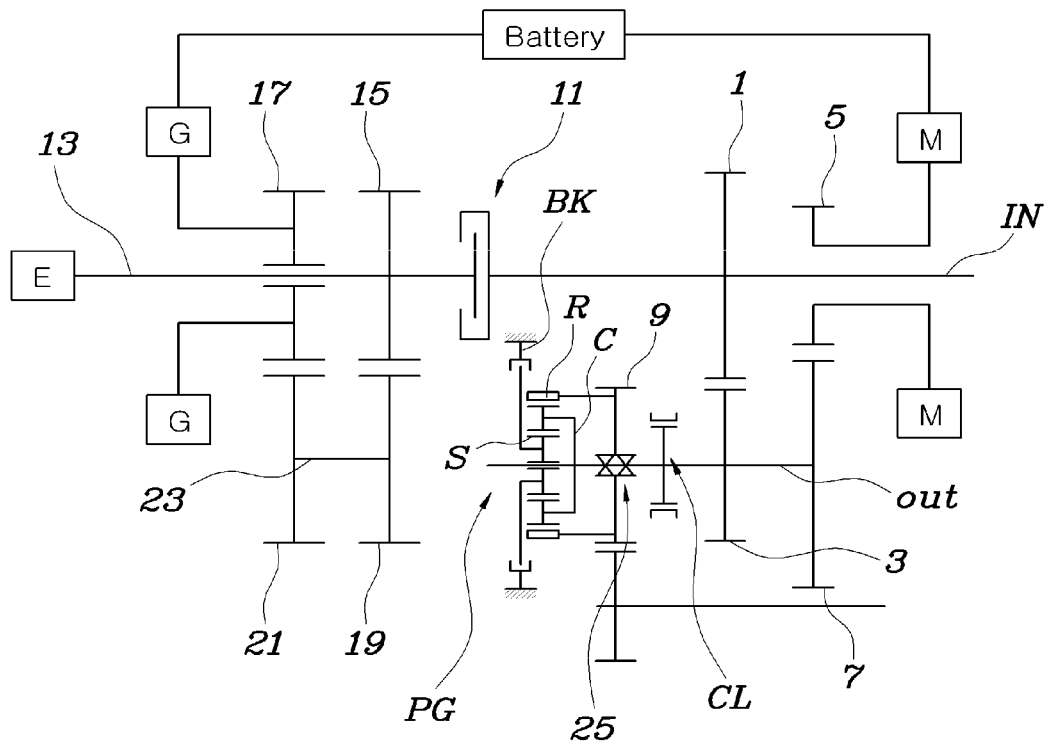
FIG. 1 is a diagram illustrating a hybrid power train for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a hybrid power train for a vehicle according to an exemplary embodiment of the present invention is configured to include: an input shaft IN mounted to selectively receive power from an engine, an engine side driving gear 1 configured to be mounted at the input shaft IN, an output shaft OUT configured to be disposed in parallel with the input shaft IN, an engine side driven gear 3 configured to be fixedly mounted at the output shaft OUT so as to be meshed with the engine side driving gear 1, a motor side driving gear 5 mounted to form a concentric shaft with the input shaft IN and mounted to rotate by the motor M, a motor side driven gear 7 configured to be fixedly mounted at the output shaft OUT so as to be meshed with the motor side driving gear 5, an output gear 9 configured to be rotatably mounted at the output shaft OUT, a one way clutch 25 configured to be mounted between the output gear 9 and the output shaft OUT so as to transmit power from the output shaft OUT only to the output gear 9 at the time of a forward driving of the vehicle, a clutch device CL configured to transmit power from the output shaft OUT to the output gear 9 at the time of a reverse driving of the vehicle, and a planetary gear apparatus PG mounted to connect between the output shaft OUT and the output gear 9.

That is, the power provided from the engine E to the output shaft OUT through the input shaft IN and the power provided from the motor M to the output shaft OUT are drawn through the output gear and when the one way clutch 25 and the planetary gear apparatus PG are mounted between the output shaft OUT and the output gear 9 to convert the power of the output shaft OUT into two stages and draw the converted output to the output gear 9 so as to implement two-stage shift stages for each mode, such that a plurality of shift stages for each mode may be implemented by a simple configuration to properly use each shift stage for each mode depending on a driving state of the vehicle, thereby improving the fuel efficiency of the vehicle.

In the planetary gear apparatus PG, a carrier C is directly connected to the output shaft OUT, a ring gear R is directly connected to the output gear 9, and a sun gear S is fixably mounted at the output shaft OUT while forming a concentric shaft and the planetary gear apparatus PG is provided with a brake BK to fix a rotation of the sun gear S.

Therefore, at the time of the forward driving of the vehicle, in the state in which the brake BK is unlocked, one stage which directly draws the power from the output shaft OUT to the output gear 9 through the one way clutch 25 is implemented and in the state in which the brake BK is locked, the power from the output shaft OUT is supplied to the carrier C, increased by the ring gear R, and then drawn to the output gear 9. Further, in this case, the one way clutch 25 allows the output gear 9 to rotate at a more rapid speed than the output shaft OUT.

Meanwhile, as described above, the clutch device (CL) is provided in order to implement the reverse driving in the above-mentioned power train, in which the clutch device CL may be formed of a dog clutch which is configured to convert a state of fixing and unlocking the output gear 9 to and from the output shaft OUT.

Further, the clutch device CL may be formed of a synchro mesh type synchro mechanism which is configured to convert the state of fixing and unlocking the output gear 9 to and from the output shaft OUT.

However, in terms of the required number of parts or cost, it is advantageous to use the dog clutch as the clutch device CL and in order to implement a reverse stage, since the output gear 9 is connected to the output shaft OUT in the state in which the vehicle stops, even thought the clutch device CL is not formed of the synchro mesh type synchro mechanism but is formed of the dog clutch, the clutch device CL does not cause an operational problem.

The reverse stage is implemented by providing the power in the reverse direction from the output shaft OUT to the output gear 9 by locking the clutch device CL as described above despite the one way clutch 25. In this case, the brake BK is in the unlocked state, and the power generated by reversely rotating the motor M reversely rotates the output gear 9 to form the reverse stage.

Meanwhile, the engine side driving gear 1 has a diameter larger than that of the engine side driven gear 3, the motor side driving gear 5 has a diameter smaller than that of the motor side driven gear 7, such that when the vehicle is driven by the engine E, the power from the engine is transmitted to a driving wheel in an overdrive state to mainly use the engine at the time of the high speed driving of the vehicle and when the vehicle is driven by the motor M, the power from the motor is reduced to increase a torque so as to be output, thereby allowing the motor to be responsible for low speed performance. Therefore, the torque characteristics of the engine and the motor complementarily works, thereby improving the fuel efficiency of the vehicle.

An engine clutch 11 is mounted between the input shaft IN and an engine rotating shaft 13 of the engine to block the power to the input shaft IN.

Further, according to the exemplary embodiment of the present invention, the hybrid power train for a vehicle further includes: a driving gear 15 for power generation configured to be mounted at the engine rotating shaft 13, a driven gear 17 for power generation configured to be rotatably mounted at the engine rotating shaft 13 while forming a concentric shaft and connected to rotate a generator G, an idler shaft 23 configured to include a first medium gear 19 which is disposed in parallel with the engine rotating shaft 13 and meshed with the driving gear 15 for power generation and a second medium gear 21 which is meshed with the driven gear 17 for power generation, such that the generator G may continuously generate electricity by the power from the engine.

As described above, the electricity generated from the generator G is stored in a battery and the electricity from the battery may be supplied to the motor M.

Figure 2:
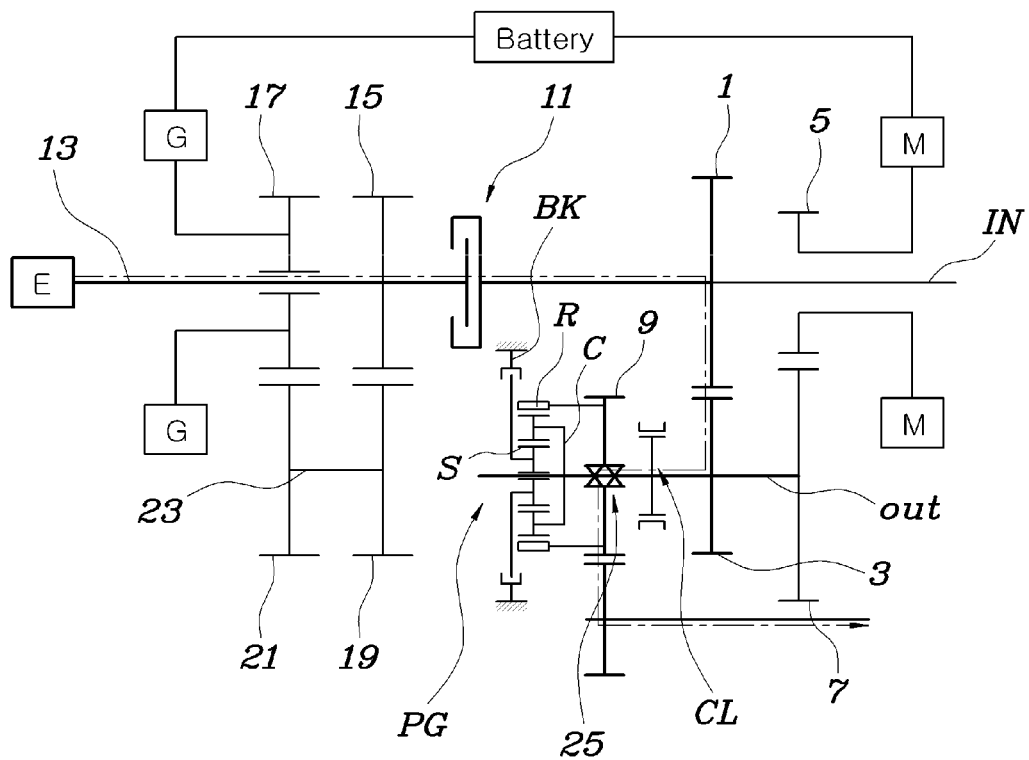
FIG. 2 is a diagram illustrating an engine mode 1-speed state in the exemplary embodiment of FIG. 1.
Figure 3:
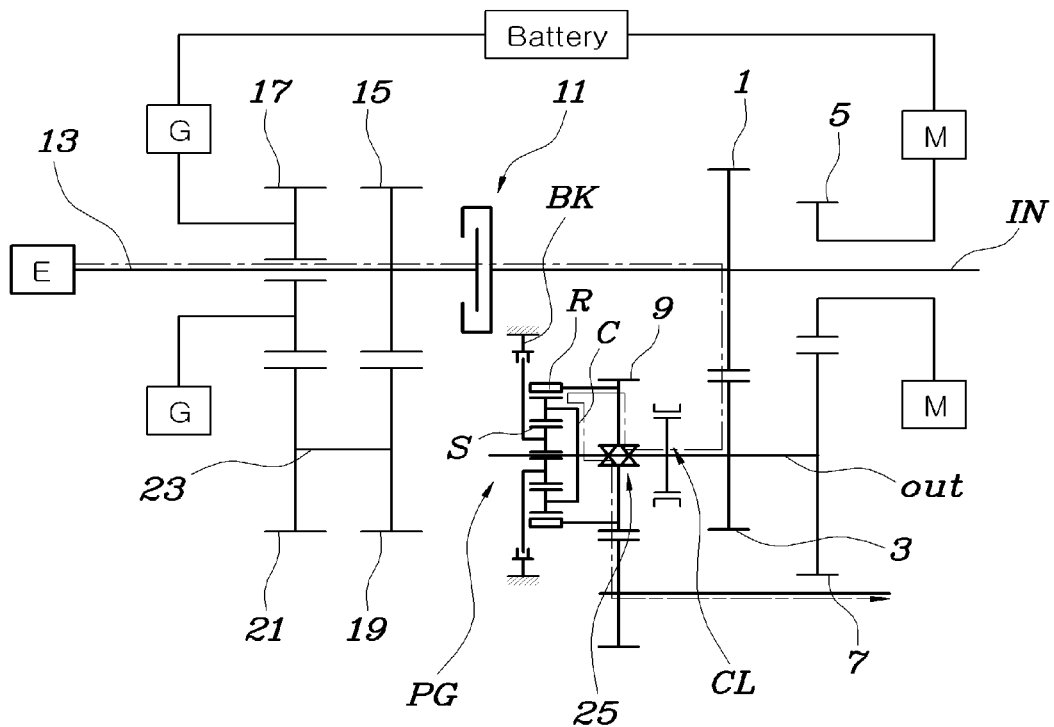
FIG. 3 is a diagram illustrating an engine mode 2-speed state in the exemplary embodiment of FIG. 1.

FIGS. 2 and 3 illustrate the engine mode according to an exemplary embodiment of the present invention and the engine mode 1 speed of FIG. 2 is implemented by locking the engine clutch 11 and unlocking the brake BK.

In this state, the power from the engine E is transmitted to the output shaft OUT via the engine side driving gear 1 and the engine side driven gear 3 through the input shaft IN and the power from the output shaft OUT is transmitted to the output gear 9 by the one way clutch 25, thereby implementing the state of drawing the output of the engine mode 1 speed.

The rotating power of the output shaft OUT is increased in the planetary gear apparatus PG depending on the locking of the brake BK in the engine mode 1-speed state to drive the output gear 9, thereby implementing the engine mode 2 speed of FIG. 3.

Figure 4:
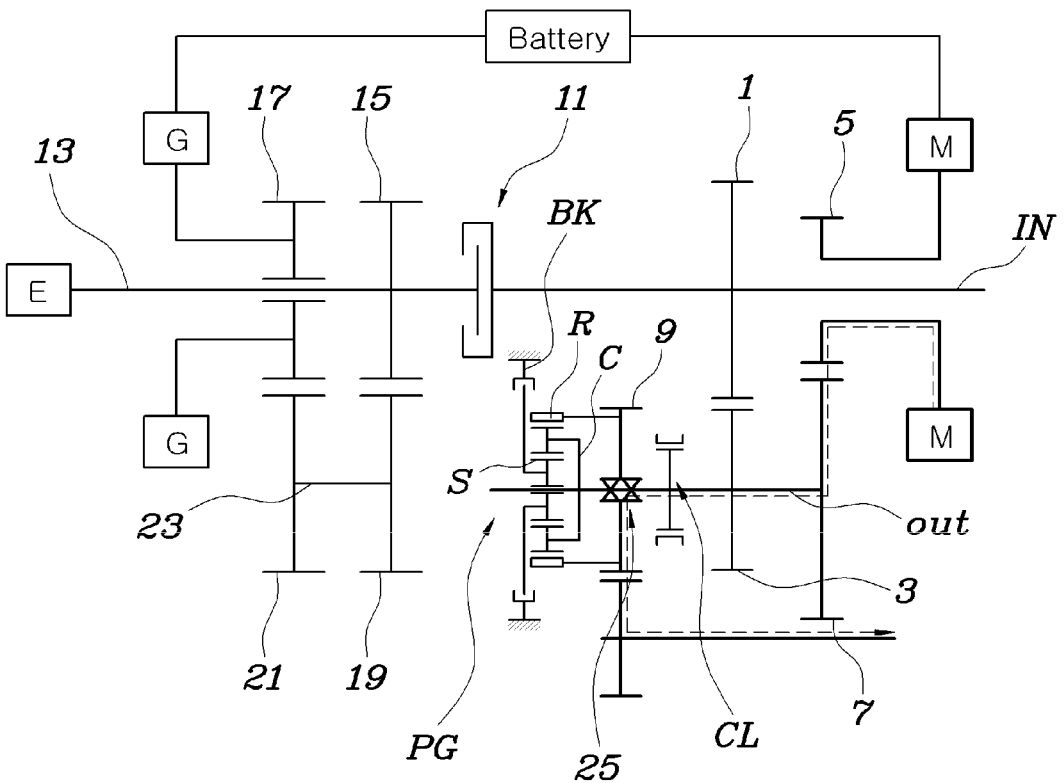
FIG. 4 is a diagram illustrating an EV mode 1-speed state in the exemplary embodiment of FIG. 1.
Figure 5:
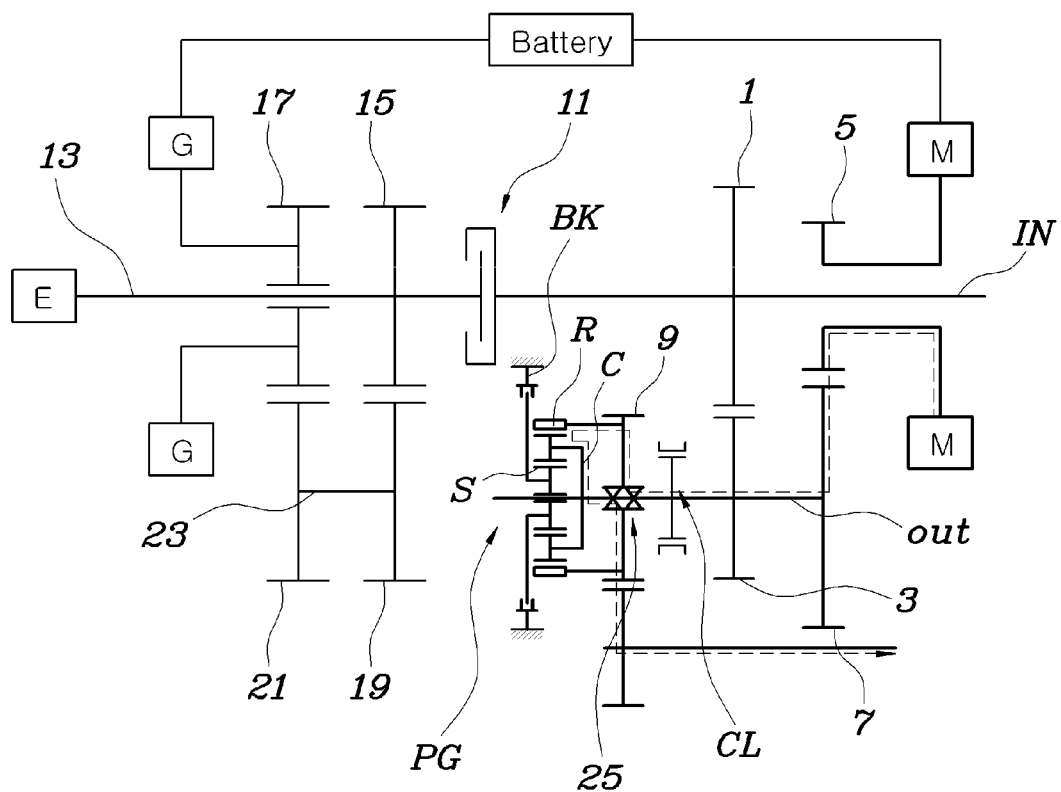
FIG. 5 is a diagram illustrating an EV mode 2-speed state in the exemplary embodiment of FIG. 1.

FIGS. 4 and 5 illustrate an EV mode, and the EV mode 1 speed of FIG. 4 transmits the power generated by driving the motor to the output shaft OUT through the motor side driving gear 5 and the motor side driven gear 7 and draws the power from the output shaft OUT to the output gear 9 through the one way clutch 25. In this case, the engine clutch 11 is in the unlocked state.

The power transmitted from the motor M to the output shaft OUT is increased in the planetary gear apparatus PG depending on the fixing of the sun gear S to the brake BK to be drawn to the output gear 9, thereby implementing the EV mode 2 speed of FIG. 5.

Figure 6:
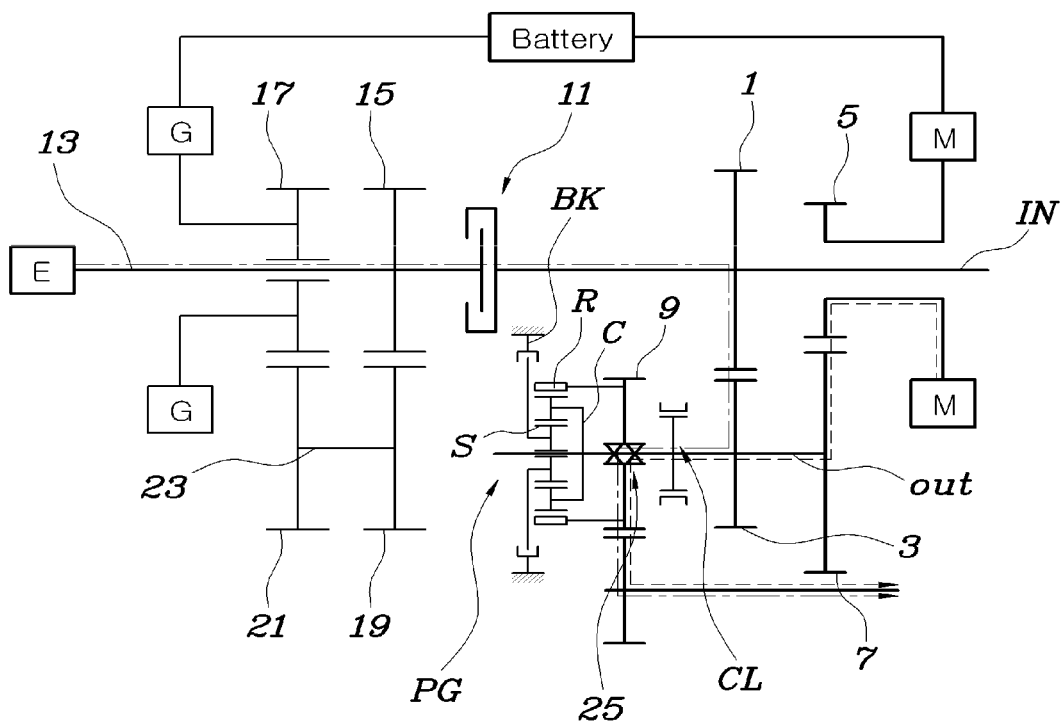
FIG. 6 is a diagram illustrating a parallel mode 1-speed state in the exemplary embodiment of FIG. 1.
Figure 7:
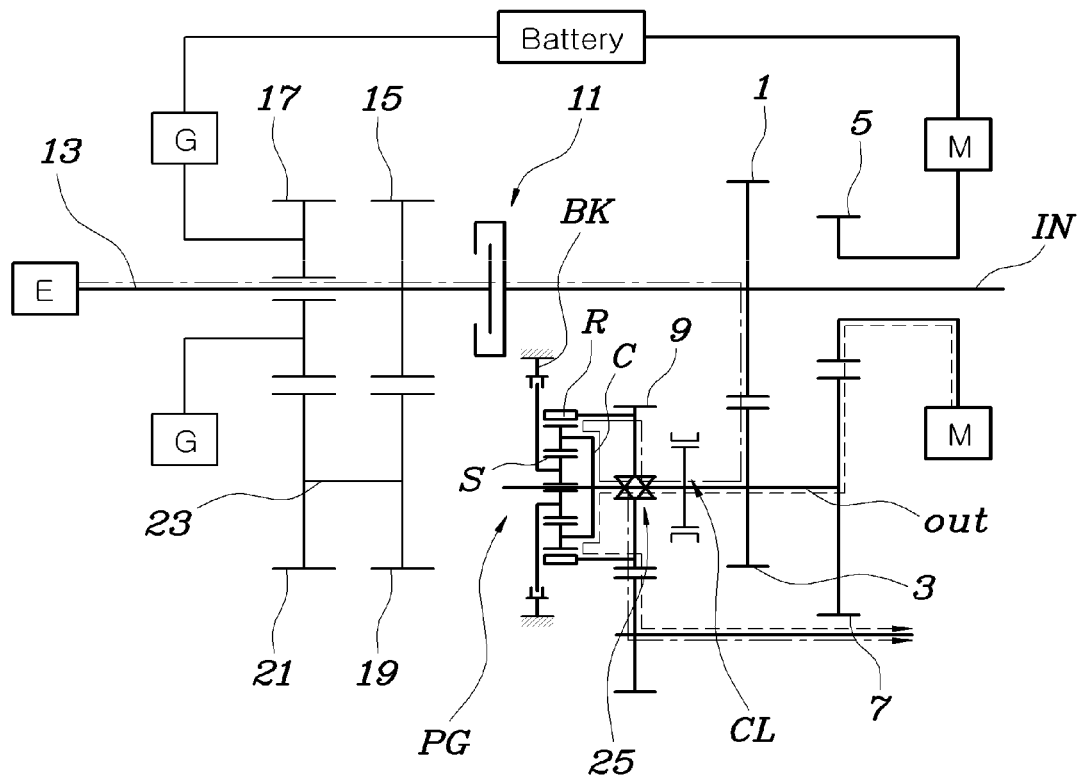
FIG. 7 is a diagram illustrating a parallel mode 2-speed state in the exemplary embodiment of FIG. 1.

FIGS. 6 and 7 illustrate a parallel mode which is one of the hybrid modes, in which FIG. 6 illustrated a parallel mode 1 speed. In this case, both of the engine and the motor are driven in the state in which the engine clutch 11 is coupled and thus the powers therefrom are summed at the output shaft OUT and the powers are drawn to the output gear 9 through the one way clutch 25.

FIG. 7 illustrates a parallel mode 2-speed state, and as the brake BK is locked in the state of FIG. 6, the powers from the engine and the motor which are summed at the output shaft OUT are increased by passing through the carrier C and the ring gear R and thus are drawn to the output gear 9.

Figure 8:
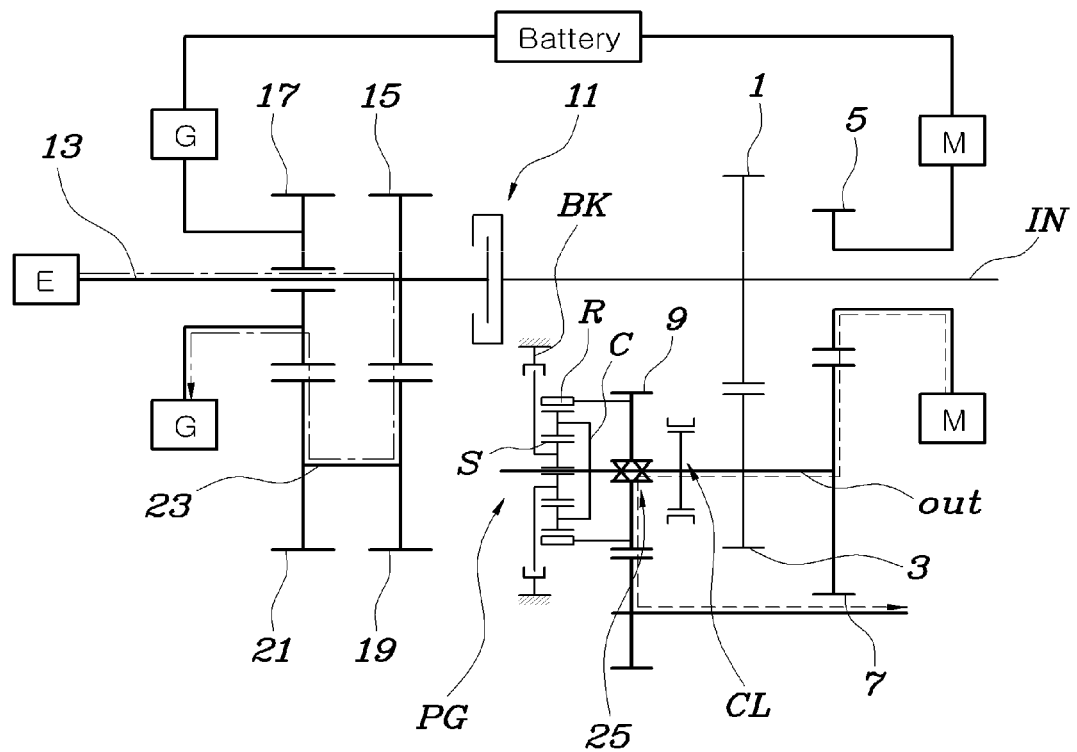
FIG. 8 is a diagram illustrating a series mode 1-speed state in the exemplary embodiment of FIG. 1.
Figure 9:
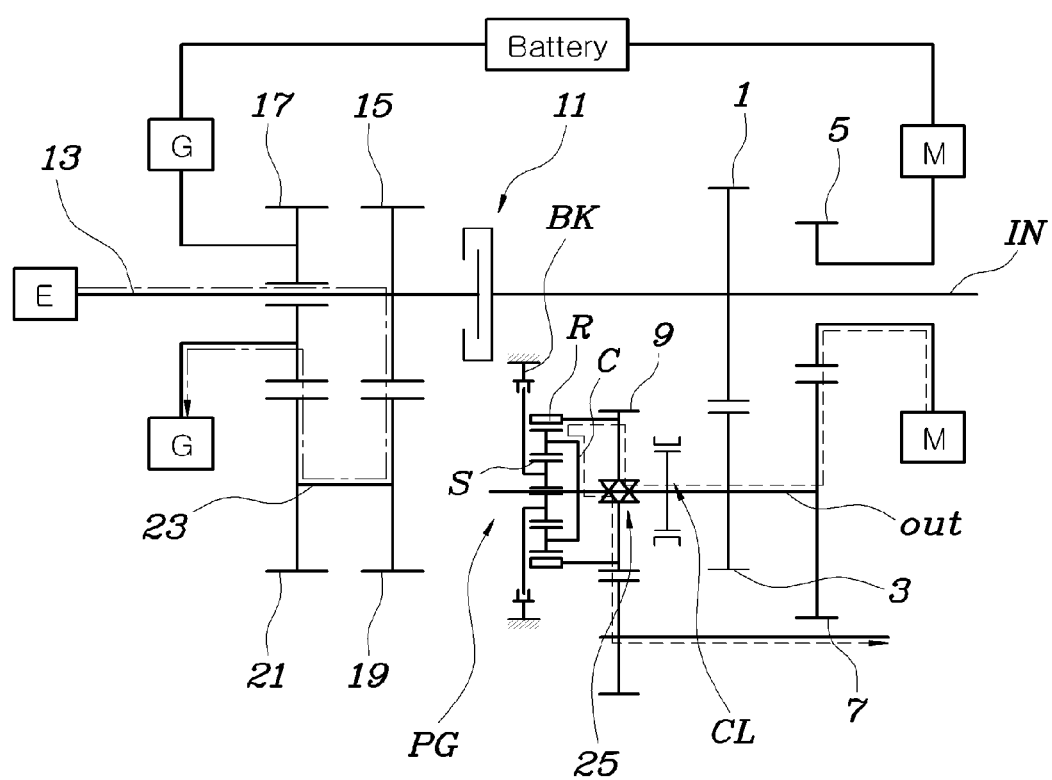
FIG. 9 is a diagram illustrating a series mode 2-speed state in the exemplary embodiment of FIG. 1.

FIGS. 8 and 9 illustrate a series mode which is one of the hybrid modes, in which FIG. 8 illustrates a series mode 1 speed. In this case, the engine is driven in the state in which the engine clutch 11 is unlocked, such that the power from the engine drives the generator to generate electricity and provide the generated electricity to the battery and the motor is driven by the electricity provided from the battery, such that the power from the motor is drawn from the output shaft OUT to the output gear 9 through the one way clutch 25.

FIG. 9 illustrate a series mode 2-speed state, and in the state of FIG. 8, the power provided from the motor to the output shaft OUT in the state in which the brake BK is operated is increased in the planetary gear apparatus PG and is drawn to the output gear 9, thereby implementing the 2-speed output state.

For reference, arrow lines indicated in FIGS. 2 to 9 indicate a main flow of power.

According to the hybrid power train for a vehicle according to the exemplary embodiments of the present invention, it is possible to improve the efficiency of the vehicle and improve the fuel efficiency of the vehicle, by implementing various driving modes by maximally using torque characteristics of an engine and a motor and implementing a plurality of shift stages for each mode by a simple configuration, if possible.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for a vehicle, comprising:
   an input shaft selectively receiving power from an engine;
   an engine side driving gear mounted at the input shaft;
   an output shaft disposed in parallel with the input shaft;
   an engine side driven gear fixedly mounted at the output shaft and meshed with the engine side driving gear;
   a motor side driving gear mounted to form a first concentric shaft with the input shaft and mounted to rotate by a motor;
   a motor side driven gear fixedly mounted at the output shaft and meshed with the motor side driving gear;
   an output gear rotatably mounted at the output shaft;
   a one way clutch mounted between the output gear and the output shaft so as to transmit power from the output shaft only to the output gear at a time of a forward driving of the vehicle;
   a clutch device mounted on the output shaft and transmitting a power from the output shaft to the output gear at a time of a reverse driving of the vehicle; and
   a planetary gear apparatus engaging between the output shaft and the output gear.

2. The hybrid power train for the vehicle of claim 1,
   wherein in the planetary gear apparatus, a carrier is directly connected to the output shaft, a ring gear is directly connected to the output gear, and a sun gear is fixedly mounted at the output shaft while forming a second concentric shaft, and
   wherein the planetary gear apparatus is provided with a brake to selectively fix a rotation of the sun gear.

3. The hybrid power train for the vehicle of claim 1, wherein the clutch device is formed of a dog clutch which is configured to convert a state of fixing and unlocking the output gear to and from the output shaft.

4. The hybrid power train for the vehicle of claim 1, wherein the clutch device is formed of a synchro mesh type synchro mechanism which converts a state of fixing and unlocking the output gear to and from the output shaft.

5. The hybrid power train for the vehicle of claim 1,
   wherein the engine side driving gear has a diameter larger than that of the engine side driven gear, and
   wherein the motor side driving gear has a diameter smaller than that of the motor side driven gear.

6. The hybrid power train for the vehicle of claim 1, wherein an engine clutch is mounted between the input shaft and an engine rotating shaft of the engine to selectively block the power to the input shaft.

7. The hybrid power train for the vehicle of claim 6, further comprising:
   a driving gear mounted at the engine rotating shaft;
   a driven gear rotatably mounted at the engine rotating shaft while forming a third concentric shaft and connected a generator to rotate the generator, an idler shaft disposed in parallel with the engine rotating shaft, wherein the idler shaft is connected to a first medium gear which is meshed with the driving gear and to a second medium gear which is meshed with the driven gear for power generation.

* * * * *